United States Patent [19]

Abbott et al.

[11] Patent Number: 5,567,812

[45] Date of Patent: Oct. 22, 1996

[54] POLYSACCHARIDE PRODUCTS DERIVED FROM *LESQUERELLA FENDLERI* AND METHODS OF THEIR PRODUCTION

[75] Inventors: Thomas P. Abbott; Kenneth D. Carlson; Robert Kleiman, all of Peoria, Ill.

[73] Assignee: The United States of America, as represented by the Secretary of Agriculture, Washington, D.C.

[21] Appl. No.: 228,316

[22] Filed: Apr. 15, 1994

[51] Int. Cl.[6] .............................. C07H 1/06; C07H 1/08; A01N 65/00
[52] U.S. Cl. ................. 536/128; 536/123.1; 536/123.12; 536/123.13; 536/127; 424/195.1
[58] Field of Search ...................... 536/127, 128, 536/123.1, 123.12, 123.13; 424/195.1

[56] References Cited

U.S. PATENT DOCUMENTS

| | | | |
|---|---|---|---|
| 3,878,195 | 4/1975 | Taillie et al. | 426/430 |
| 4,119,435 | 10/1978 | Nakao et al. | 426/481 |
| 4,225,673 | 9/1980 | Sugiura et al. | 435/911 |
| 4,325,882 | 4/1982 | Reiners | 536/128 |
| 4,361,697 | 11/1982 | Dobberstein et al. | 536/128 |
| 4,594,412 | 6/1986 | Kitagawa | 536/128 |
| 4,859,371 | 8/1989 | Diosady et al. | 536/128 |
| 4,892,938 | 1/1990 | Giovanetto | 536/127 |
| 4,895,938 | 1/1990 | Teraoka et al. | 536/128 |
| 4,906,746 | 3/1990 | Barnier et al. | 536/127 |
| 4,950,751 | 8/1990 | DeWitt | 536/128 |
| 4,952,686 | 8/1990 | Renn et al. | 536/114 |
| 4,968,694 | 11/1990 | Madsen et al. | 536/128 |
| 4,980,186 | 12/1990 | Sharafabadi | 426/425 |
| 5,086,043 | 2/1992 | Liu | 514/23 |
| 5,268,467 | 12/1993 | Verbiscar | 536/123 |
| 5,275,834 | 1/1994 | Thibault et al. | 426/577 |

OTHER PUBLICATIONS

Mikolajczak et al., *JAOCS*, 1962, 39, 78–80.
Tookey and Jones, *Econ. Botany*, 1965, 19, 165–174.
Barber et al., *Mosquito News*, 1974, 34, 394–398.
Dea, *Gordon and Breach Sci. Pub.*, New York, NY, 1987, 367–385.
Cui et al., *Food Chem.*, 1993a, 46, 169–176.
Cui et al., *Carbohydr. Polymers*, 1993b, 20, 215–225.
Bailey, *Biochem. J.*, 1935, 29, 2477–2485.
Tyler, *J. Chem. Soc.*, 1965, 5288–5300.
Grant et al., *Chem. Commun.*, 1969, 805–806.
Saddiqui et al., *Carbohy. Res.*, 1977, 54, 231–236.

*Primary Examiner*—Ronald W. Griffin
*Attorney, Agent, or Firm*—M. Howard Silverstein; Joseph A. Lipovsky; John D. Fado

[57] ABSTRACT

Previously unrecognized polysaccharide products are extracted from either whole *Lesquerella fendleri* seed or commercially processed and oil-extracted seed meal or presscake or other seed material. Processes used include the steps of: (1) combining the seed material with an aqueous solution; (2) high speed stirring or sonication of the resultant seed material for the separation of the polysaccharide from the seed; and (3) isolation of the polysaccharide from the aqueous filtrate. The resultant polysaccharides are highly polymeric and enhance solution viscosities over a wide range of pH, bleaching and salt conditions.

20 Claims, 3 Drawing Sheets

POLYSACCHARIDE PRODUCTS DERIVED FROM *LESQUERELLA FENDLERI* AND METHODS OF THEIR PRODUCTION

FIELD OF THE INVENTION

This invention relates to the recovery of novel polysaccharide products from *Lesquerella fendleri*.

BACKGROUND OF THE INVENTION

*Lesquerella fendleri* is a desert shrub native to the American Southwest. The species has been previously recognized as possessing a seed oil containing hydroxy fatty acids that have potential industrial uses. (Mikolajczak et al., JAOGS 1962, 39, 78–80). Lesquerella seed swells in water to 13 times its original volume and this occurs mainly in the seed surface gum (SSG) or capsular gel layer. Recognition that *L. fendleri* was a potential source of polysaccharide gums was made during a survey (Tookey and Jones, *Econ. Botany*, 1965, 19, 165–174) wherein the ground seeds were found to contain 19.5% gums by weight. Recovery of the gum was accomplished by hot water extraction of whole ground seeds and subsequent precipitation with ethanol. Cited values in the survey were corrected for protein content and components not hydrolyzable with dilute acid. An ash and moisture-free mucilaginous material derived from *L. fendleri* has been examined for use in entrapping mosquito larvae (Barber et al., *Mosquito News*, 1974, 34, 394–398).

Properties of acidic polysaccharide gums such as those derived from Lesquerella, depend greatly on structure and are as diverse as their compositions. Properties also change drastically in synergistic combinations with other gums (Dea; *Gordon and Breach Sci. Publ.*, New York, N.Y., 1987). The wide variations of composition and structure within the class render each gum unique, ranging from gum arabic, an exudate, which has a low viscosity in solution to water-insoluble, capsular gels from seeds, which thicken solutions by entirely different physical mechanisms than do soluble polysaccharides. Gums have a number of commercial applications, but are used primarily to increase the viscosities of aqueous solutions or to form gels. Lesquerella gums are unique in that other gums used commercially are not extracted from oilseeds or oilseed presscake.

*L. fendleri* is a crucifer. Other cruciferous seed gums that have been thoroughly analyzed include *Sinapis alba* L. (yellow mustard) seed which has 5% mucilage, 56% of which is water soluble (Cui et al., *Food Chem.*, 1993a, 46, 169–176). This crude mucilage was composed of 15% glucuronic and galacturonic acids, 24% glucose, 14% galactose, 6% mannose, 3% rhamnose, 3% arabinose and 1.8% xylose. Ash (15%), and protein (4.4%) were the other major components in addition to the polysaccharides. The water-soluble component was further characterized as a mixture of a pectic polysaccharide composed of galacturonic acid, galactose, and rhamnose; a β-1,4 -glucan; and polysaccharides composed mostly of neutral sugars with non-reducing end residues of glucuronic acid (Cui et al., *Carbohydr. Polymers*, 1993b, 20, 215–225). *Lepidium sativum* (cress) seed has a capsular gel and a water-soluble gum similar to those of lesquerella seeds, but the gums make up only 2.6% of the seed weight (Bailey, *Biochem. J.*, 1935, 29, 2476–2485; Tyler, *J. Chem. Soc.*, 1965, 5288–5300). *Brassica sinapis alba* (white mustard) also has a cold-water-soluble soluble polysaccharide that has been reported to contain as much as 50% microcrystalline cellulose in micelles (Grant et al., *Chem. Commun.*, 1969, 805–806). *Brassica campestris* (rapeseed) has been shown to contain 0.25% of a complex polysaccharide mixture (Siddiqui et al., *Carbohy. Res.*, 1977, 54, 231–236).

SUMMARY OF THE INVENTION

We have now surprisingly discovered that, with utilization of novel extraction protocol, it is possible to efficiently recover from either whole or processed seed of *Lesquerella fendleri* high quality polysaccharide products possessing desirable rheological properties. Requisite process steps comprise: combining the seed material with an aqueous solvent; freeing the polysaccharide from the seed material; isolation of the seed material; and removal of the solvent to provide the polysaccharide product. By the tailoring of an optional prewash Step in the process for the purpose of removing water soluble constituents, it is possible to select between the degree of product recovery and the viscosity enhancing properties of the polysaccharide product. These methods allow utilization of existing process waste streams and add to the economic incentive of utilizing *Lesquerella fendleri* as a cash crop in the arid regions of the American Southwest.

In accordance with our discovery it is an object of this invention to provide processes for effective extraction of polysaccharide products from *Lesquerella fendleri*.

It is another object to make use of industrial waste materials for recovery of economically useful products.

It is also an object to provide an economically attractive source of previously unrecognized gels and gums.

It is a further object to provide gels and gums possessing desirable viscosity enchancing properties.

Other objects and advantages of this invention will become readily apparent from the ensuing description.

DETAILED DESCRIPTION OF THE INVENTION

Figure 1:
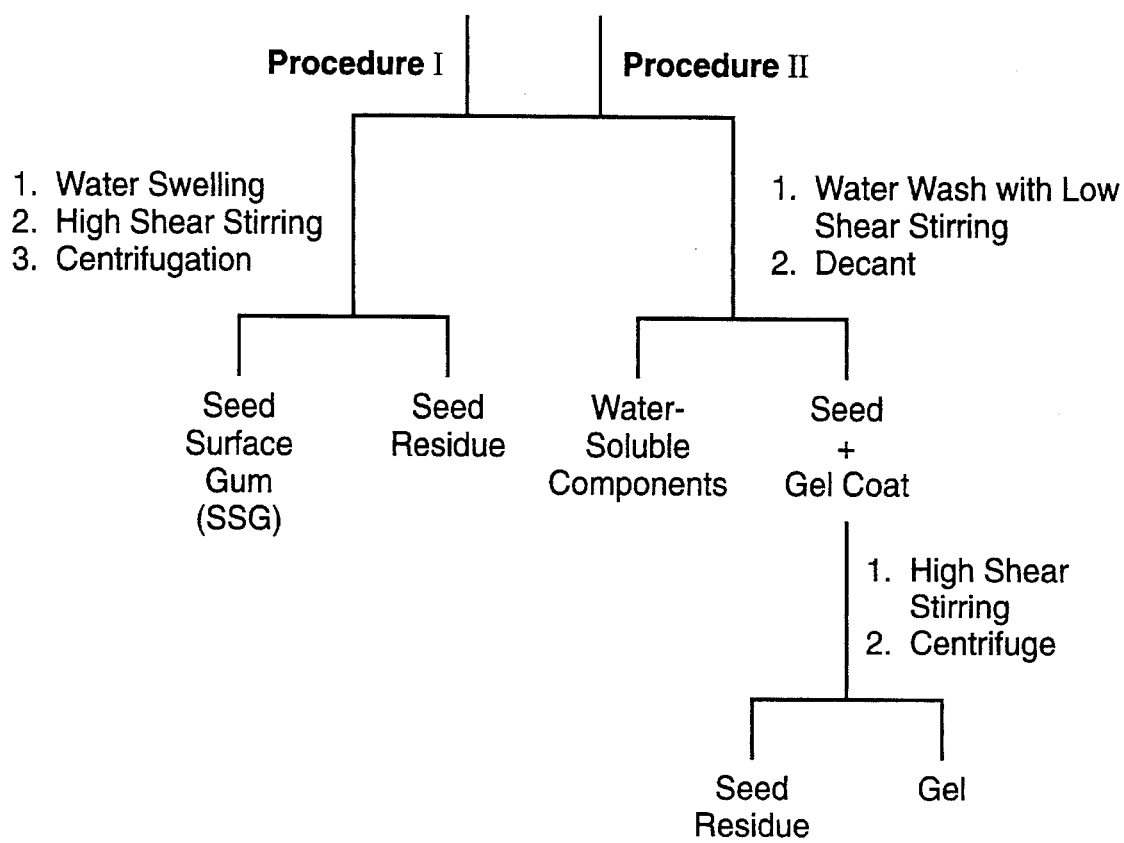
FIG. 1 shows the protocol for isolation of polysaccharide gums and/or gels from whole seed.

The methods of the instant invention allow the recovery of novel polysaccharide products possessing desirable rheological properties from the seed of *Lesquerella fedleri*. This seed material may be either whole or in the form of an oil extraction byproduct such as a presscake or hexane-extracted meal.

The seed material is first combined with an aqueous solvent for sufficient time to swell the desired seed-based polysaccharides. The time required for this process typically ranges from about 0.25 hours to about 4 hours, with a preferred time range of about 0.75 hours to about 1.5 hours. Times in excess of 24 hours may be utilized without detriment, however, no benefits for doing so have been recognized. The range of useable temperatures for this process is from about 15° C. to about 95° C. Excessive solution viscosity becomes the limiting factor at the lower end of this range while degradation of the polysaccharides is the concern at the higher temperatures. Ambient temperatures (e.g., 20°–25° C.) are advantageous due to the lack of energy requirements and represent the conditions under which the ensuing examples were run. pH is not seen as a critical parameter for this process with all ranges being viewed as useable but the range of about 5 to about 8 being preferred. Aqueous solvents are viewed as including water alone as well as its combination with soluble amounts of lower ($C_1$–$C_6$) alkanols. The aqueous solvent is optionally envisioned to include chelating agents, such as ethylenediaminetetraacetic acid, for the purpose of removing crosslinking agents such as calcium and magnesium salts. While entire hydration of the seed based polysaccharides is not necessary, use of sufficient water so as to achieve at least 50% hydration and preferably at least 90% hydration is desired.

After swelling, the polysaccharide must be freed from the seed material. Due to its relatively high tenacity, a form of physical disruption, such as sonification or high-shear stirring, wherein shear values exceed the Reynolds number of the solution, must be used. Impeller speeds ranging from about 300 RPM to about 6000 RPM are envisioned as useful. Because shearing action was not governed solely by RPM alone but also by impeller design and flow patterns in the tank, longer times are required at lower RPMs and less time at higher shear rates in order to completely disrupt the polysaccharides. The time for this may range from about 0.1 second to about 30 minutes, with a preferred time frame of about 5 minutes to about 10 minutes. An alternate approach known as jet cooking may also be used. This is a process wherein superheated pressurized steam is introduced with product suspensions in a venturi which causes a rapid heating and shearing of the product stream. Due to the short contact times, temperatures as high as about 120° C. may be utilized.

The seed material is then isolated from the polysaccharide-solvent mixture by any conventional means such as filtration or centrifugation. Useful filter pore sizes for whole seed residue are preferably no larger than about 1 mm in size, while pore sizes for meal residue are preferably no larger than about 50 microns in size. Desirable forces for centrifugation range from about 800×g to about 20,000×g with optimum at 5000–15,000×g.

The solvent is then removed from the polysaccharide product by any conventional means within the ambit of the skilled artisan, such as evaporation or lyophilization. Solvent removal may be, for example, by means of drum drying wherein the polysaccharide suspension (about 0.5 to about 1% by weight of the solvent) is poured onto rotating stainless steel rolls heated to 155° C. with steam. Upon contact, the solvent component evaporates off while the product is continuously scraped off the roll with a doctor blade. Typical contact times for this temperature are less than 2 minutes. The determination of appropriate exposure times may be readily determined for conditions involving differing parameters.

The polysaccharide product of this invention may be a single component or a mixture, wherein 50% to 100% by weight of which is comprised of polymeric molecules of repeating sugar units linked to the polymer or branch chains and associated ionically or covalently bound metal ions and proteins. This product may be in either the form of a gel or a gum comprised of one or more soluble polysaccharides. Gels are herein defined as crosslinked polysaccharides and their crosslinking agents possessing a three dimensional network and being effectively insoluble in water (>90% insoluble at a concentration of 5 g/l at 25° C.). Gums are herein defined as polysaccharides and polysaccharide mixtures that are at least partially soluble in water. The gums of the instant invention possess viscosities ranging from about 300 cp to about 800 cp at a 1% weight concentration in 2% aqueous NaCl at 25° C. and a pH of 6–7; preferred gums possess a minimum viscosity of about 400 cp under like conditions. The gels of the instant invention possess minimum apparent viscosities of about 800 cp at a 1% weight concentration in 2% aqueous NaCl at 25° C. and a pH of 6–7; preferred gels possess a minimum apparent viscosity of about 1000 cp under like conditions. Most preferred gels possess a minimum apparent viscosity of about 1500 cp under these same conditions. It should be noted that gels, being effectively insoluble, cannot have a "normal" viscosity, but contribute to the "apparent viscosity", by means of thickening the solution.

These methods may be additionally comprised of a preliminary wash step to remove water-soluble components wherein the seed material is immersed in water ranging in temperature from about 15° C. to 95° C. for a period ranging from about 1 minute to about 15 minutes. The seed material is allowed to settle without stirring and then the supernatant is decanted off. This process may be repeated until the desired amount of water soluble components have been removed.

The following examples are presented for the purpose of clarifying the claimed invention and are not meant to be viewed in a limitative manner.

EXPERIMENTAL

Materials. Hexane-extracted meal was supplied by the Agrigenetics Corporation after processing at Texas A&M University to remove oil. It contained 2 to 3% residual oil. Presscake meal from single pressed seed was supplied by International Flora Technologies (Apache Junction, Ariz.). It contained 11.1% oil, 5.04% ash and 24.4% crude protein. *Lesquerella fendleri* seed NU64261 was from the seed collection at the National Center for Agricultural Utilization Research (Peoria, Ill.). Standard sugars, uronic acids and lactones, and xylan were purchased from Aldrich (Milwaukee, Wis.). Gum arabic, xanthan gum, and guar gum were purchased from Sigma (St. Louis, Mo.). Cellulose used in the hydrolysis studies was sterile cotton, U.S.P. from Johnson and Johnson (New Brunswick, N.J.). Microcrystalline cellulose for FTIR spectra was from Supelco, Inc. (Bellefonte, Pa.). Reagent grade chemicals were used in all tests unless otherwise noted. Deionized, organics free water with an 18 megaohm resistance was used in laboratory experiments; water purified by reverse osmosis was used in pilot plant experiments.

Viscosities. Unless otherwise states, viscosities were measured with a Labline Model 4537 viscometer (#3 spindle, 30 rpm, 25° C.).

Laboratory-Scale Aqueous Separations

Examples 1 and 2

From whole seed. Washing with water was done in two different ways in separate experiments (FIG. 1). A one minute rinse was used to remove superficial dust in both experiments, but in Procedure II, four additional water washes of the fully swollen seed were made at 30 minute intervals which removed 92% of SSG water-soluble components. After the seeds were washed to extract water-soluble components, the swollen surface cells were fractured by stirring in a blender at high speed for 20 seconds. Gel from washed and fractured seed was easily squeezed through a double layer of cheesecloth to separate the SSG gel from the largely intact seed. This step, while not requisite, is beneficial with regard to reducing centrifuge residue volume. A 1:1 dilution of the SSG gel reduced viscosity sufficiently so that centrifuging at 12,000 rpm (19,800×g) removed the final traces of non-gel seed residue. The total seed surface gum; i.e., capsular gel layer (SSG), was recovered by shear mixing the swollen seed and centrifuging as above, but without first washing out soluble components (See Procedure I, FIG. 1).

Example 3

From Hexane-extracted Meal. Hexane-extracted meal (HM), 63 g, mixed 1.5 L water and stirred in a blender for 60 seconds, gave a viscous, gelatinous mixture that was not separated by centrifuging at 2,000 rpm (800×g). After dilution to 3 L, however, brown seed residue was sedimented under the same conditions. The top layers were clear to light tan and gelatinous. The combined gelatinous layer was freeze-dried (HMG1 in FIG. 2).

Pilot Plant Scale Separations

Example 4

Meal (2 kg) that had been commercially deoiled by extraction with hexane was agitated with an air-stirrer in 100 L water for 2 hours. It was then stirred with a Cowles Model 7VT Dissolver, which is a high-shear mixer. Samples were taken at 2.5 and 5 minutes to test for release of the gel fraction. The resulting suspension was centrifuged in a Sharples 3-inch bowl centrifuge (12,780×g). One pass was sufficient to retain the seed residue but not the gel layer, although the bowl was nearly completely filled. The gel layer was partially drum-dried and partially freeze-dried (HMG2 in FIG. 2).

The same pilot plant procedure was used for separation of gums from presscake meal (PCG).

Laboratory-scale Aqueous Separations

Results and Discussion

The capsular seed surface layer was not removed either by shaking on a rotating table in water at 25° C. for 6 hours (Bailey, 1935) or by squeezing through layered cheesecloth after swelling and decanting in 25° C. water over several hours. Fracturing the swollen seed surface layer with a Waring Blender was necessary before it could be separated from seed particles. Photomicrographs show that the seed surface cells are physically attached to the seed and contain the desired gel, but have stronger cell walls than previously described for other seeds. Characteristics of freeze-dried seed surface gums (SSG) are listed in Table I. The gum-free residue (73.2%) from 60 g seed contained 33.8% oil on a dry basis compared to 24.8% oil in the original seed. A low level of oil (1.05%) was found in the recovered SSG (21% of the seed weight). When the swollen seed was washed with water before disrupting the gelatinous surface layer, 13.1% of the seed weight was recovered as gel and 7.9% as water-soluble components. This result is important because the four water washes removed most metal salts and low-molecular-weight components while leaving gel components (92% undialyzable) having 4.18% ash content (dry basis). These low molecular-weight components are not functional for enhancing viscosity, but rather can reduce the contributions of the seeds gel components to viscosity enhancement. In the water-soluble extract only 58.6% is retained on dialysis and 11.7% is ash. Oil analyses of starting seed and recovered seed revealed little or no oil extraction into the gums.

SSG best exemplifies the polysaccharides extractable from the seed surface alone, and is useful for comparison to gels and soluble components extracted from presscake and hexane-extracted meal.

Gums extracted from presscake or hexane-extracted meal will also contain seed endosperm components, some of which would be expected to contribute to the viscosity. Therefore, the component gums from the meal would be expected to differ from those obtained from the seed surface.

HMG1, the gum isolated from hexane-extracted meal (FIG. 2), was gelatinous in a 1% solution that had a viscosity of 280 mPa s. The dried gum amounted to 47% of the starting meal and, when dialyzed against water, 80% was retained (polymeric components). Dried gum contained 20.6% crude protein (3.2% N), 2.0% oil and less than 1% β-glucan.

Color is important for many cosmetic applications and may require bleaching. For oil drilling applications or thickening of acidic foods, stability over a wide pH range or in the presence of salts may be important. Solubility and stability of 1% dispersions of HMG1 were tested in mild acidic base, or in $H_2O_2$ for color bleaching. A significant portion (>80%) of every sample was not hydrolyzed or degraded by 1 hour treatment with 1% $H_2O_2$ ($T_1$), 0.1N NaOH at 80° C. ($T_2$), 0.1N HCl at 80° C. ($T_3$), 1% $H_2O_2$ at pH10 ($T_4$), or HCl to pH 4 ($T_5$). Viscosities of the 1% solutions, after these treatments were 180, 200, 130, 140, and 160 mPa s, respectively, compared to a control value of 250 mPa s with no treatment. A brown seed residue remained (14%) in the control and after $T_1$, $T_4$ or $T_5$ when centrifuged at 21,000×g but not after $T_2$ or $T_3$. After each of the last four treatments, 26, 40, 26, and 33% respectively of HMG1 was dialyzable permeate compared to 20% with no chemical treatment. In general, this gum isolate retains thickening ability over a wide range of pH or after peroxide bleaching.

Hydrolysis of the gels, after the above treatments, with 1N TFA for 6 hours at 100° C. left unhydrolyzed residues (27 to 31% of the starting gel weight). The non-dialyzable components of HMG1 were also unhydrolyzed to the extent of 27% by the same treatment. Hydrolyzed gums were analyzed for sugars, and the unhydrolyzed residue for nitrogen content and by FTIR.

Pilot Plant Scale Separations

Example 5

Of Hexane Extracted Meal. Stirring 2 kg of hexane-extracted meal at 2% concentration in water with an air stirrer only slightly increased the viscosity to 80 mPa s. Higher shear achieved with the Cowles Dissolver rapidly increased the solution viscosity as the gelatinous gums were released from denser, opaque seed particles. Samples taken after 2.5 minutes and 5 minutes shearing revealed that the longer stirring time did not significantly increase the amount of gums recovered. After centrifugation, 19 kg of the supernatant was drum-dried to give 103 g of recovered product. The remaining supernatant was freeze-dried to yield 600 g of water soluble components (HMG2) for an overall yield of 35.2%. HMG2 contained less seed residue than HMG1 because the pilot plant centrifuge operates at much higher centrifugal force (see FIG. 2). Less seed residue is reflected in the lower yield, lower nitrogen content and higher viscosity for a 1% solution of HMG2 compared to HMG1. Drum-drying enhanced viscosity by 16% and demonstrated that the gums are sufficiently heat stable for drum drying. The increase in viscosity may be caused by protein denaturation or more stable bond formation between components during the hot drum drying process. HMG2 is 54% macromolecular compared to 83% for SSG. The higher ash content of HMG2 is due to water-soluble salts from the endosperm and that SSG was prepared from cleaned, washed seeds, whereas hexane extracted meal was from unwashed seed processed in commercial equipment.

Example 6

Of Hexane Extracted Meal. Isolation of a gum with an ash content of 4.5%, low-molecular weight components of 17% and little or no water-soluble gum components was accomplished by washing the meal with water before using high shear mixing to release the gel component. The extent of this preliminary washing affects the degree to which these properties are reduced. Yields of the gel component by this two step extraction were 17 to 20% of the meal weight. Apparent viscosity of the gel component was 1,630 mPa s in a 1% aqueous solution.

Example 7

Of Presscake. Presscake (11.1% oil, 5.04% ash and 3.90% N) that was finely ground was separated in the same way as HM except that viscosity was followed as a function of stirring time with the Cowles Dissolver. Viscosity rose from 330 mPa s at 1 minute, to 550 at 5 minutes, but fell to 390 after 10 minutes. Vicosity of the effluent from the centrifuge varied from 390 to 420 mPa s compared to 209 to 234 m Pa s for the effluent from the HMG2 separation. The effluent was partially drum-dried and partially freeze-dried as presscake gum (PCG). Yield of PCG was higher than HMG2 and 86% was non-dialyzable, but this value is deceiving because the smaller initial particle size of the ground presscake left more seed residue in the gum isolate. More seed residue is evidenced in the higher nitrogen level and lower viscosity of PCG compared to HMG2 (Table I). Lower oil content, 3.1% in PCG, than in the original presscake indicates that the major portion of the oil was retained in the centrifuged solids. It should be noted that color and optical clarity of the gum isolates in Table I depended on the amount of seed residue remaining in the gum, and a 2% dispersion, ranged from tan-brown opaque to water white translucent in the order HMG1, PCG, HMG2, SSG.

TABLE I

| | L. fendleri Gum Properties | | | |
| --- | --- | --- | --- | --- |
| | SSG | HMG1 | HMG2 | PCG |
| Yield % | 21 | 47 | 35 | 45 |
| N, % | 1.56 | 3.2 | 2.08 | 2.62 |
| Ash, % | 7.02 | 7.72 | 9.93 | 6.54 |
| Polymer, % | 82.6 | 80 | 54 | 86 |
| Viscosity,[b] mPa s | 800 | 280 | 420 | 380 |
| Oil, % | 1.05 | 1.96 | | 3.14 |

[a]SSG: Gum from the surface of whole seed, separated from seed residue at 22,100 × g in a high speed centrifuge. HMG1: Gum from hexane-extracted meal, separated at 800 × g. HMG2: Gum from hexane-extracted meal, separated at 12,780 × g in a pilot plant centrifuge. PCG: Gum from presscake also separated at 12,780 × g.
[b]1% gum in a 2% NaCl solution, saturated with $CaCO_3$.

Fractionation of HMG2 Gums

Example 8

HMG2 was fractionated by a number of procedures (FIG. 3) before analyses of component sugars, uronic acids, component amino acids, and metal ions. In the first procedure, water-insoluble seed residue was centrifuged from a 1% dispersion of HMG2 at 22,100×g. The supernatant was diluted by 50%, centrifuged, washed and centrifuged again. A clear layer and a gel layer formed after each centrifugation. The clear layers were decanted and combined as water-soluble components (F1). The combined gel layers were made 0.1% in disodium EDTA, stirred 15 minutes and recentrifuged. A clear layer above the gel was decanted and the gel was washed again with 0.1% EDTA. On the basis of supernatant and gel layer volumes, the combined washes removed 75% of EDTA extractable components. The remaining gel was diluted 1:1 with 2N NaOH, stirred and centrifuged. The supernatant (84% by volume) was decanted (F3) and the centrifugate gel (F4) not washed. F1 through F4 were dialyzed against water, and the permeate of F1 (F1P) and all retentates were freeze-dried.

Figure 3A:
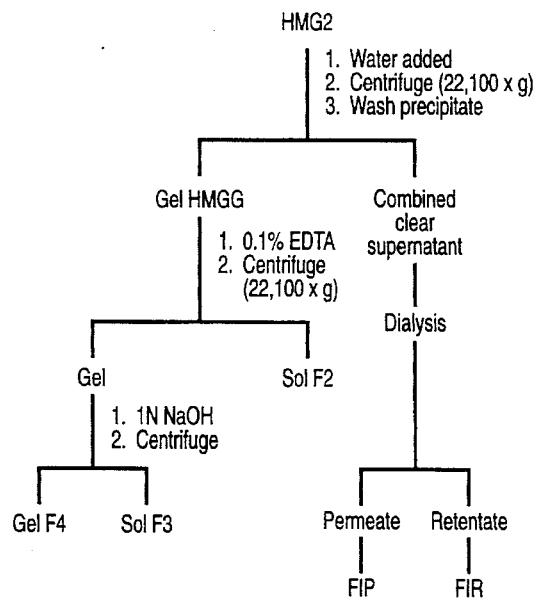
FIG. 3 shows the protocol for fractionation of HMG2 gum isolate.
Figure 3B:
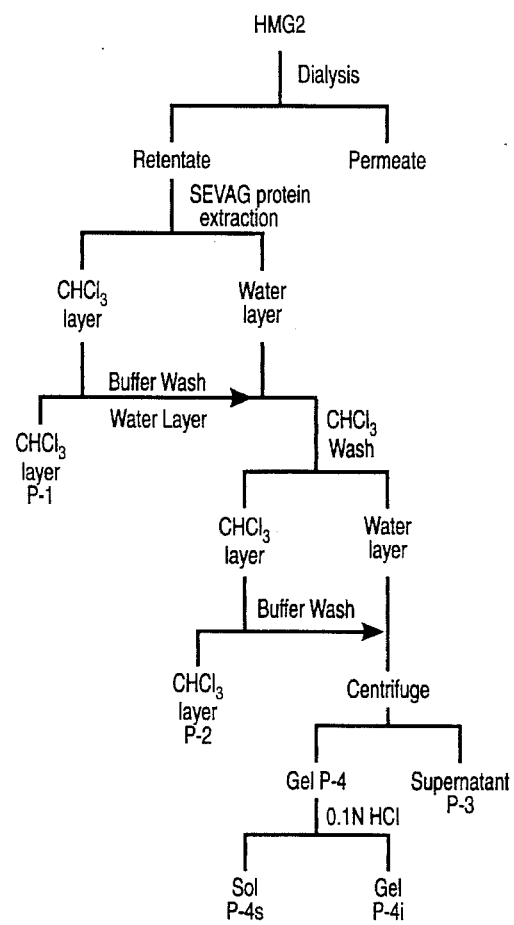

The second separation was made on HMGP, the dialysis retentate of HMG2 (FIG. 3). To remove protein, a 0.5% solution was treated with 0.5% $Na_2CO_3$ at 50° C. for 2 hours, neutralized with acetic acid, mixed with $CHCl_3$/pentanol, and centrifuged according to the Sevag procedure (Staub, 1965). The $CHCl_3$ layer was washed with buffer and the washed $CHCl_3$ extract (protein) saved as P-1. The combined aqueous supernatant and wash were reextracted in the same way, and the second $CHCl_3$ extract (P- 2) was saved. Excess $CHCl_3$ was removed by nitrogen purge, but some pentanol remained in the water and gel phases. The initial polysaccharide concentration was below 0.35% at this point, and a clear supernatant layer (61% by volume) formed and was decanted (P-3). The protein-depleted gel layer (P-4) was dialyzed, freeze-dried and further separated into 0.1N HCl extractable (P-4s) and residual gel (P-4i) components by stirring for 15 minutes in 0.1N HCl at room temperature and centrifuging. $CHCl_3$ and pentanol were removed from the $CHCl_3$/pentanol extract in vacuo on a rotary evaporator and salts were removed by dialysis.

A 0.2% solution of HMG2 was centrifuged and washed twice with water. The clear supernatant layer was decanted each time and the gel layer was retained. This treatment removed water soluble components of HMG2. The water-extracted, gel components were freeze-dried (HMGG).

Chemical Analyses. Oil was determined by Butt extraction. Uronic acids were determined by the procedure of Blumenkrantz and Asboe-Hansen (1973). Galacturonic acid was used as the standard. Amino acid analysis was done at the University of Illinois Protein Sequencing Laboratory, Urbana, Ill. Metal analysis was performed on a Perkin Elmer 400 ICP apparatus using NIST standards. β-glugan was measured with a Biocon assay kit which is based on degradation β-glucosidase with and measurement of the glucose generated.

Sugar Analyses. Sugars, soluble polysaccharides, and gels were present in several samples. Removal of excess reagents, such as borate after $NaBH_4$ reduction, from polysaccharides was by dialysis. Borate was removed from sugars by treatment with AG 50-X8 acid form ion exchange resin and then repetitive distillation with added methanol.

The basic analytical procedure for sugars consisted of $NaBH_4$ reduction of aldoses in the presence of $Na_2CO_3$ to protect uronic acids (Lehrfeld, 1987), activation of uronic acids with 1-(3-dimethlyaminopropyl)-3-ethylcarbodiimide (DMECDI) at pH 4.75, and then reduction of uronic acids at pH 7 with $NaBD_4$ (Taylor and Conrad, 1972).

Uronic acid residues in polysaccharide samples (20 mg) were also treated with DMECDI and reduced with $NaBD_4$ as above. Excess $NaBD_4$ was decomposed with 6–8 drops of 25% acetic acid in water and the solution was dialyzed. Reduced polysaccharide samples were divided and one half was hydrolyzed with 2N trifluoroacetic acid (TFA) at 120° C. for 30 min. as above. The other half was hydrolyzed in 6N HCl under $N_2$ for 24 hours at 110° C. TFA was removed, and a phenyl-β-glucopyranoside internal standard was then added. The hydrolysate was reduced with $NaBH_4$, excess borohydride decomposed and the sample passed through AG 50-X8 ion exchange resin. Unhydrolyzed residue was lost on the resin. Excess borate was removed by evaporation with methanol. Samples were acetylated as above and then analyzed as peracetylated alditol acetates. Controls of guar, gum arabic, xanthan gum, cellulose (cotton), and xylan were analyzed by the same methods along with the samples. Samples hydrolyzed in 6N HCl were treated similarly to TFA hydrolysates.

To assess reaction losses, galactose, arabinose, and xylose were hydrolyzed in 2N TFA at 120° C. for 30 minutes, internal standard added, reduced with $NaBH_4$ and acetylated.

Fractionation. The fractionation of HMG2 with EDTA and NaOH yielded, (as percentages of HMG2): seed residue, 3.1%; F1 permeate, 4.1%; F1 retentate, 12.5%; F2, 8.5%; F3, 12.0%; and F4, 14.3%. The total recovery (54.5%) agrees with dialysis of HMG2 against water to yield 54% retentate and indicates that no apparent hydrolysis occurred during the separation, which suggests that endogenous polysaccharidases are not a problem in this meal.

The second fractionation of HMGP based on protein extraction and solubilization with HCl yielded: seed residue, 4.3%; first protein extract (P-1), 14.5%; second protein extract (P-2), 5%; clear supernatant (P-3), which also contained $Na_2CO_3$ and pentanol, 21.5%; and deproteinized gel layer (P-4), 36.9%. Fraction P-4 was subsequently divided into 0.1N HCl extractable, P-4s, (34.3%) and residual gel, P-4i, (48.0%) components. In summary, 82.2% of HMGP was recovered in fractions P-1 to P-4i, and P-4 was apparently hydrolyzed to the extent of 17.7% by treatment with HCl.

Component Analyses of Gums and Isolates

Example 9

Sugar, protein, and uronic acid analyses of lesquerella gums and their components are listed in Table II. In the water-extracted gum, HMG2, not all of the nitrogen is accounted for by the amino acid analysis. Low-molecular-weight salts likely account for the difference, because the non-dialyzable portion of HMG2, HMGP, has only protein nitrogen. The overall neutral sugar compositions of HMG2 and HMGP differ slightly in galactose and glucose. These are among the three sugars found in the low-molecular-weight dialysis permeate F1-mannose, galactose and glucose. Further differentiation of HMG2 polymeric components into water-soluble polymers, F1 retentate, and water-washed gel, HMGG, indicate that the water-soluble gums are higher in rhamnose, galactose and glucose and slightly lower in arabinose. The gelled component is lower in rhamnose, galactose and glucose and higher in arabinose.

TABLE II

Compositions of Lesquerella Gums and Gum Fractions[a]

| Fraction | Mole ratios of component sugars | | | | | | | % GalA | Crude protein %[c] | Protein from AA %[c] |
|---|---|---|---|---|---|---|---|---|---|---|
| | Rha | Ara | Xyl | Man | Gal | Glc | GalA | | | |
| HMG1 | 0.2 | 1.0 | 0.2 | 0.1 | 1.6 | 0.6 | | | 20.0 | 13.9 |
| HMG2 | 0.6 | 1.0 | 0.1 | 0.1 | 2.0 | 0.7 | | | 13.0 | 6.56 |
| HMGP | 0.5 | 1.0 | 0.1 | 0.1 | 1.4 | 0.5 | 0.74 | 15.7[b] | 12.7 | 14.7 |
| F1 permeate | — | — | — | 1.0 | 1.1 | 7.3 | | | | 1.33 |
| F1 retentate | 1.1 | 1.0 | 0.2 | 0.1 | 2.6 | 0.9 | | | 10.3 | 8.18 |
| F2 | 0.9 | 1.0 | 0.1 | 0.1 | 2.2 | 0.8 | | | 22.6 | 5.14 |
| F3 | 0.3 | 1.0 | 0.1 | 0.1 | 1.6 | 0.7 | | | 20.7 | 5.30 |
| F4 | 0.2 | 1.0 | 0.1 | 0.1 | 1.5 | 0.3 | | | 10.0 | 6.89 |
| P-1 | 0.3 | 1.0 | 0.1 | 0.1 | 1.1 | 0.2 | | | 33.3 | 29.1 |
| P-2 | 0.3 | 1.0 | 0.1 | 0.1 | 1.6 | 0.4 | | | 25.0 | 21.9 |
| P-3 | 0.8 | 1.0 | 0.1 | 0.1 | 2.3 | 0.6 | | | 5.69 | 4.65 |
| P-4 | | | | | | | | 17.2 | 4.75 | 4.50 |
| HMGG | 0.3 | 1.0 | 0.1 | 0.1 | 1.5 | 0.4 | | 10.0 | 15.1 | 7.20 |
| P-4s | 3.7 | 1.0 | 0.2 | 0.2 | 5.4 | 2.7 | | | | |
| P-4i | 0.3 | 1.0 | 0.1 | 0.1 | 1.4 | 0.4 | | | | |
| Arabic | 0.5 | 1.0 | — | — | 1.3 | 0.3 | | 22.2 | | |

Figure 2:
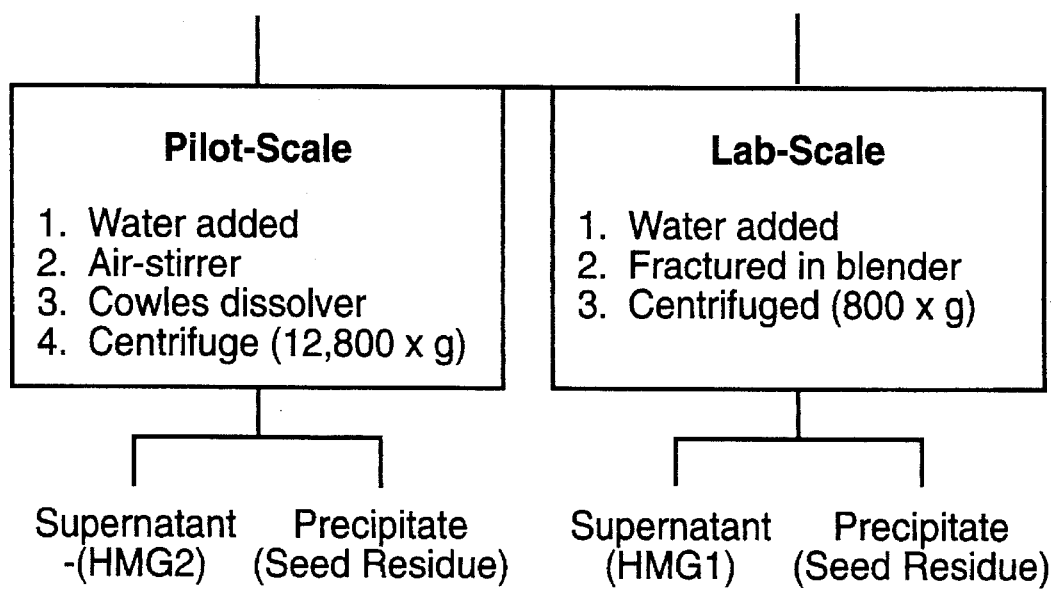
FIG. 2 shows the protocol for isolation of polysaccharide gums from hexane-extracted meal.

[a]See Figures 1–3 for description of gum and isolates.
[b]13% protein, 4% ash.
[c]Crude protein = %N × 6.25. Protein from amino acid analysis (AA) was calculated from moles of amino acid residues per unit sample weight.

Uronic acid was higher in the F1 retentate than in HMGG. Galacturonic acid was shown by GC/MS of alditol acetates in an hydrolysate of deuterioreduced gum to be the only uronic acid present. Alditol acetate from reduced galacturonsyl residues is probably the source of the higher galactose value in the sugar analysis of F1R. Protein was lower in the water-soluble fractions than in the total gums. If a mixture of polymers is present, the results based only on extractability with water and dialysis suggest that the soluble polysaccharides in HMG2 are composed in part of a polygalacturonate and that increased amounts of rhamnosyl residues are associated with higher uronic acid content extracts. Insoluble arabinans, uronates and some proteins occur in the water-insoluble gels.

HMGG ash content is 4.61% compared to 3.95% in HMGP after 3 days dialysis and 2.52% for HMGP exhaustively dialyzed for a month. Dialyzable salts from HMG2 are mainly Na and K (Table III). Calcium appears to be retained in equal amounts in the dialyzed (HMGP) and original extract, HMG2. These results suggest that uronic acid residues cross-linked by $Ca^{++}$ and $Mg^{++}$ contribute to stability of the gel fraction. The water-washed gel, however, is lower in Ca and Mg but higher in Fe, Na and K than is HMGP. This result is unexpected, but a cellulose component or insoluble arabinans would contribute less to the metal ion content, than would soluble uronates.

Attempted chemical fractionation of the gel components, first with EDTA and then with NaOH after water extraction, led to soluble polysaccharides with, on the basis of N and amino acid analysis (Table II), bound EDTA that could not be displaced on dialysis even in the presence of NaOH. It is, therefore, surprising that gel not extracted into water, EDTA or NaOH (F4) retained a compositional profile very similar to the unfractionated HMGP and the water-extracted gel (HMGG). However, a substantial unhydrolyzed residue, which may be cellulose, remained after hydrolysis of F4 with 2N TFA.

from this gum. P-2, the second extracted protein component, is similar to P-1 but has more carbohydrate. Once the protein is largely extracted, the soluble polysaccharides remaining, P-3, are similar to the soluble polysaccharides in F1R. Separating the remaining gel with 0.1N HCl into extractable (P-4s) and gel (P-4i) components gives some indication of a galacturonosyl-rhamnosyl polysaccharide derived from hydrolytic loss of arabinosyl sidechains. The resistant gel, P-4i, cannot be cellulose alone, as evidenced by the remaining hydrolyzable sugar and protein components.

Amino acid analyses of the gums and isolates (Table IV) indicates that the proteins found in various fractions were not very different from one another, with the exception of the dialysis permeate, F1P, which was high in proline, glycine, and aspartic acid/asparagine. Proline often is higher in the gels than in the soluble isolates.

TABLE IV

| | Amino Acids (Mole % of Total Amino Acids in Gums and Isolates | | | | | | | | | | | | | | | | | |
|---|---|---|---|---|---|---|---|---|---|---|---|---|---|---|---|---|---|---|
| sample | Asx | Glx | Ser | His | Gly | Thr | Ala | Arg | Tyr | Cys | Val | Met | Phe | Ile | Leu | Lys | Pro |
| HMG1 | 10.2 | 14.1 | 8.38 | 1.84 | 12.7 | 5.59 | 8.66 | 5.75 | 2.08 | 0.42 | 4.47 | 0.36 | 3.82 | 3.51 | 6.22 | 4.33 | 7.68 |
| HMG2 | 11.6 | 13.9 | 11.5 | 1.49 | 15.2 | 5.7 | 10.1 | 4.58 | 3.35 | 0.15 | 3.85 | 0.47 | 3.45 | 3.49 | 4.53 | 2.41 | 4.37 |
| HMGP | 10.9 | 11.8 | 11.8 | 1.45 | 16.3 | 6.44 | 10.9 | 4.58 | 1.36 | 0.28 | 4.11 | 0.22 | 3.65 | 3.0 | 4.83 | 2.68 | 5.73 |
| F1 permeate | 17.9 | 25.2 | 4.15 | 1.58 | 8.58 | 2.48 | 5.22 | 4.52 | 0.07 | 2.47 | 1.64 | 2.24 | 2.59 | 1.49 | 11.1 | 12.5 |  |
| F1 retentate | 11.53 | 8.99 | 17.0 | 0.87 | 18.6 | 7.13 | 12.8 | 3.39 | 1.2 | 0.39 | 3.5 | 0.27 | 3.54 | 2.72 | 2.64 | 1.67 | 3.74 |
| F2 | 11.1 | 8.83 | 15.2 | 1.05 | 18.8 | 7.16 | 13.0 | 4.22 | 1.09 | 0.32 | 3.69 | 0.25 | 3.58 | 2.68 | 2.85 | 1.74 | 4.45 |
| F3 | 10.3 | 13.1 | 11.2 | 1.6 | 16.9 | 5.73 | 10.3 | 4.95 | 1.39 | 0.15 | 3.91 | 0.21 | 3.93 | 3.3 | 4.92 | 2.05 | 6.06 |
| F4 | 11.0 | 14.2 | 8.63 | 1.78 | 12.3 | 5.63 | 8.84 | 4.5 | 2.21 | 0.08 | 5.07 | 0.28 | 4.23 | 4.47 | 7.71 | 2.66 | 6.34 |
| P-1 | 10.1 | 11.1 | 12.2 | 1.26 | 16.1 | 6.73 | 11.1 | 4.94 | 1.47 | 0.49 | 4.23 | 0.2 | 3.74 | 3.01 | 5.02 | 2.11 | 6.31 |
| P-2 | 10.3 | 12.0 | 11.0 | 1.31 | 16.5 | 6.52 | 10.4 | 4.65 | 1.25 | 0.39 | 4.34 | 0.21 | 3.65 | 3.13 | 5.58 | 2.53 | 6.27 |
| P-3 | 12.1 | 9.85 | 16.0 | 0.94 | 19.9 | 6.83 | 12.0 | 2.65 | 1.22 | 0.51 | 3.68 | 0.3 | 3.38 | 2.48 | 2.88 | 1.19 | 4.08 |
| P-4 | 11.7 | 11.7 | 12.9 | 1.15 | 17.0 | 6.09 | 10.4 | 3.48 | 1.32 | 0.58 | 4.45 | 0.71 | 4.09 | 3.74 | 4.64 | 1.66 | 4.38 |
| P-4i | 11.2 | 12.9 | 12.0 | 1.35 | 15.2 | 6.22 | 10.7 | 3.36 | 1.27 | 0.21 | 4.17 | 0.18 | 3.82 | 3.36 | 5.52 | 1.72 | 6.73 |
| HMGG | 10.5 | 14.0 | 9.05 | 1.73 | 14.0 | 5.69 | 9.1 | 4.95 | 1.69 | 0.28 | 4.36 | 0.32 | 3.92 | 3.69 | 6.38 | 3.59 | 6.82 |

TABLE III

| | Metals (mg/g) in Gums and Isolates | | | | | | | |
|---|---|---|---|---|---|---|---|---|
| | Ca | Zn | Na | Cd | Fe | Mn | Mg | K |
| HMG1 | 5.86 | .033 | .193 | 0 | .191 | 0 | 2.76 | 3.58 |
| HMG2 | 6.99 | .014 | .546 | 0 | .196 | 0 | 2.30 | 5.00 |
| HMGP | 7.30 | .029 | .102 | 0 | .298 | 0 | 2.34 | .304 |
| HMGG | 3.19 | .024 | .302 | 0 | .960 | 0 | .960 | 1.03 |
| P-3 | 2.24 | .013 | 11.9 | 0 | 0 | 0 | .497 | .039 |

Extraction of protein from HMGP by the Sevag procedure reduced protein in extracted fractions to less than 6%. The large amount of $Na_2CO_3$ used in the separation appears to disrupt some of the bonding with proteins. However, washing the $CHCl_3$ extract with additional $Na_2CO_3$ gave an apparent protein extract which was still largely carbohydrate (33% protein), which suggests that the protein is strongly linked to the polysaccharides isolated with it. Except for the lower galacturonosyl content, the polysaccharide bound to the proteins appears to be the same as seen in other fractions

We claim:

1. A method of extracting a polysaccharide product, which possesses a minimum viscosity of about 300 cp at a 1% weight concentration in 2% aqueous NaCl at 25° C. and pH 6.7, from the seed material of *Lesquerella fendleri* comprising:

a) combining the seed material of *Lesquerella fendleri* with an aqueous solvent for sufficient time to swell said polysaccharides;

b) freeing the polysaccharide product from the seed material;

c) isolating the seed material from the polysaccharide entrained solvent; and d) removing the solvent to provide a polysaccharide product.

2. The method of claim 1 wherein the seed material is in the form of presscake, meal, or whole seeds.

3. The method of claim 1 wherein the solvent is water.

4. The method of claim 1 wherein the polysaccharide product is freed from the seed material by means of stirring, sonification or jet cooking.

5. The method of claim 1 wherein the isolation step c) is carried out by means of filtration and/or centrifugation.

6. The method of claim 1 wherein the polysaccharide product is in the form of a gum.

7. The method of claim 6 wherein the gum possesses a viscosity ranging from about 300 cp to about 800 cp at a 1% weight concentration in 2% aqueous NaCl at 25° C. and pH 6–7.

8. The method of claim 7 wherein the gum possesses a minimum viscosity of about 400 cp at a 1% weight concentration in 2% aqueous NaCl at 25° C. and pH 6–7.

9. The method of claim 1 additionally comprising a preliminary step of extracting water-soluble components from the seed material by washing said material with water.

10. The method of claim 9 wherein said washing step requires immersion of said seed material in water for a period ranging from about 1 minute to about 4 hours.

11. The method of claim 9 wherein the polysaccharide product is in the form of a gel.

12. The method of claim 11 wherein the gel possesses a minimum apparent viscosity of about 800 cp at a 1% weight concentration in 2% aqueous NaCl at 25° C. and pH 6–7.

13. The method of claim 1 wherein the solvent is removed by means of drum drying or lyophilization.

14. A polysaccharide product extracted from the seed material of *Lesquerella fendleri* which possesses a minimum viscosity of about 300 cp at a 1% weight concentration in 2% aqueous NaCl at 25° C. and pH 6–7.

15. The product of claim 14 possessing a nitrogen content ranging from about 1% to about 5% by weight, an ash content ranging from about 6% to about 10% by weight, and an oil content of less than about 4% by weight.

16. The product of claim 15 being in the form of a gum and possessing a viscosity ranging from about 300 cp to about 800 cp at a 1% weight concentration in 2% aqueous NaCl at 25° C. and pH 6–7.

17. The product of claim 16 with a minimum viscosity of about 400 cp at a 1% weight concentration in 2% aqueous NaCl at 25° C. and pH 6–7.

18. The product of claim 15 being in the form of a gel and possessing a minimum apparent viscosity of about 800 cp at a 1% weight concentration in 2% aqueous NaCl at 25° C. and pH 6–7.

19. The product of claim 18 possessing a minimum apparent viscosity of about 1000 cp at a 1% weight concentration in 2% aqueous NaCl at 25° C. and pH 6–7.

20. The product of claim 18 possessing a minimum apparent viscosity of about 1500 cp at a 1% weight-concentration in 2% aqeuous NaCl at 25° C. and pH 6–7.

* * * * *